United States Patent Office 2,985,595
Patented May 23, 1961

2,985,595
PREPARATION OF ACTIVE CONTACT MASSES FROM KAOLIN CLAYS
George R. Bond, Jr., Paulsboro, N.J., assignor to Houdry Process Corporation, Wilmington, Del., a corporation of Delaware
No Drawing. Filed Nov. 6, 1958, Ser. No. 772,156
4 Claims. (Cl. 252—437)

The present invention is concerned with the preparation of contact masses from kaolin clays for catalytic conversion of petroleum fractions and other hydrocarbonaceous materials. The invention is more particularly directed to the preparation of such contact masses having improved selectivity for the production of desirable end-products and having physical properties of highly desirable nature.

It is well-known in the art that commercially useable contact masses are readily prepared from sub-bentonite clays of the montmorillonite family such as by a process of leaching the clay with a mineral acid to effect removal of a portion of the clay components comprising undesirable materials such as iron and alkali metal compounds. Similar leaching attempts to prepare catalytically active kaolin catalyst of commercial acceptability with various modifications has met with only limited or doubtful success. Kaolin clays of commercial acceptability have more recently been prepared by processes generally similar to that set forth in co-pending application Serial No. 508,798, filed May 16, 1955, now U.S. Patent No. 2,904,520. By this method kaolin clay is treated with controlled amounts of a sulfating agent to convert a relatively large part of the aluminaceous content of the clay to the sulfate form with subsequent treatment effecting decomposition of the formed sulfate under such conditions that the alumina is retained in the clay material and the sulfate ion is removed as gaseous compounds, e.g., oxides, of sulfur.

Experience over a period of years in the commercial use of kaolin catalyst thus prepared has shown a high degree of desirable characteristics of such catalyst in commercial operation. In other words, in most commercial uses, such catalyst has been successfully employed in existing equipment with a product distribution of hydrocarbons processed in contact therewith of commercially acceptable nature. However, it has been found that for certain specific commercial operations commercial kaolin catalyst has been less desirable on a cost and operation basis in giving a product distribution of the type and nature whereby a refinery operation of the catalytic cracking-type can be effected practically and economically.

In some catalytic cracking operations using a gravitating bed of particulate solids of the size range herein envisaged, namely in the order of about 2 to 14 mm. in their shortest cross-sectional dimension, mechanical and practical conditions are such that the amount of carbonaceous material deposited on the catalyst during the cracking operation may be a controlling factor in the quantity of charge processed and in the extent of conversion of such charge. Similarly, economics demand a reasonable minimum production of commercially acceptable products. Thus a suitable catalyst is circumscribed not only by its selectivity and activity but by its ability to deliver over extended time periods its desired results.

It has now been found that a highly desirable type of catalytic activity meeting the specialized requirements of a section of the catalytic cracking problems can be obtained through a new method of treating kaolin catalyst whereby a final material of controlled activity and commercially acceptable physical properties is obtained. By the process of this invention control of activity, improved selectivity for certain desirable end-products over certain undesired end-products is obtained; and the catalyst has hardness characteristics and resistance to steam deactivation making its utilization in moving catalyst systems suitable and economical.

It has been found in investigation of properties and the control of the cracking properties of kaolin clays that magnesium sulfate added to the clay in varying amounts effects a noticeable change in the activity, and to some extent selectivity, of such kaolin materials in their use as hydrocarbon conversion catalysts. Depending on the amount of magnesium sulfate added the activity, as indicative of the general catalytic level of the kaolin mass, ranges more or less proportionately with the amount of magnesium sulfate from a high level substantially equal to that of usual commercial kaolin catalyst containing no added magnesium sulfate to a material having greatly reduced catalytic activity when magnesium sulfate in an amount above about 4 or 5 wt. percent kaolin was added. The addition of magnesium sulfate to the kaolin while giving some measure of control of the catalyst activity evinced certain other characteristics of a detrimental and objectionable nature particularly that of reducing the hardness of the final catalyst to a degree seriously affecting its commercial acceptability and reducing its resistance to deactivation by high temperature steam. This latter factor is of considerable importance in commercial operation in that normal catalytic cracking operation employs relatively large quantities of steam at temperatures in the range of 850° to well over 1000° F.

It has been found in other work that treatment of sulfated-desulfated kaolin clays with phosphoric acid under certain conditions (see co-pending application Serial No. 567,715, filed February 27, 1956), resulted in kaolin catalysts having superior hardness characteristics and certain improved product distribution characteristics appearing as a reduced tendency for the formation of coke during catalytic cracking. These latter catalytic materials appeared as resistant to high temperature steam deactivation as the customarily commercially acceptable kaolin catalyst prepared by the process described in Serial No. 508,798.

That logic has little place in the development of materials having catalytic activity is apparent when the logical combination of magnesium sulfate addition to kaolin plus the addition of phosphoric acid, in the hopes of obtaining the beneficial aspects of each, resulted in failure in that neither the activity nor the selectivity nor the physical properties, including hardness, were sufficiently modified in a desirable direction.

It has been found in accordance with this invention that cracking catalyst prepared from kaolin clay by process which includes the steps of sulfation, denning and desulfation has improved characteristics of selectivity, activity and hardness when such process includes during the sulfation step the introduction into the clay of magnesium phosphate additive prepared by the reaction of magnesia with an excess of phosphoric acid. The magnesium phosphate additive is prepared by reacting phosphoric acid with magnesia in a mol ratio greater than 1 to 1, preferably in a mol ratio of 5–12 to 1. Phosphoric acid in amounts in excess of about 15 mol ratio to magnesia serves no apparently useful purpose and is not recommended. The amount of magnesium phosphate additive thusly prepared is combined in the clay mix to introduce the equivalent of 0.05 to 5% MgO and 0.15 to 15% $H_3PO_4$, both by weight of the final catalyst; the preferred amount of magnesium phosphate introduces, by weight of the final catalyst, the equivalent of 0.25–1% MgO and 1.25–12% $H_3PO_4$.

Whatever reasons may be advanced to explain this phenomenon, it is necessary to preform the magnesium phosphate. As is shown below with a similar preparation excepting the use of magnesium as magnesium sulfate and phosphoric acid instead of the preformed magnesium phosphate, the final catalyst failed to show the desired and required characteristics. Although no limitation is to be applied to the invention on the basis of such explanation, it appears that magnesium phosphate does not react with alumina to form spinels or similar materials since certain physical measurements show marked differences between catalyst materials prepared from magnesium sulfate inclusion, phosphate inclusion, or mixed phosphate-magnesium sulfate inclusion, as compared to the material containing magnesium phosphate which shows characteristics similar to kaolin alone.

A better understanding of the invention without being limited thereby will be had by reference to the following examples:

Example I

Approximately 5 kilograms of raw kaolin clay and concentrated (93.2%) sulfuric acid, in an amount equivalent to 76.9% as 100% $H_2SO_4$ based on the weight of dry clay, were mixed for 20 minutes in a Lancaser mixer and extruded in an Auger extrusion machine with a 4 mm. die plate at 35–40 pounds torque into cold denning oil. The oil temperature was raised to 300° F. and the extruded material was oil denned for 4 hours at 300° F. The oil-denned material was separated from the denning oil, placed in a furnace and heated to 300° F. in nitrogen and then heated in steam to 1100° F. and then in 15% hydrogen–85% steam up to 1500° F., held for 4 hours, then cooled to 1100° F. in steam. Upon cooling to room temperature the material had an apparent density of .760, a surface area of 92 square meters per gram, and a knife-edge hardness of 7,700. Knife-edge hardness is determined, as the weight in grams, by loading a knife edge (of the type used in analytical balances), placed transversely upon the cylindrical surface of the pellet until the pellet breaks.

The catalytic behavior of the above catalyst was determined by a standard laboratory test method modified from the well-known standard Cat-A method (see "Laboratory Method for Determining the Activity of Cracking Catalysts," by J. Alexander and H. E. Shimp, page R537, National Petroleum News, August 2, 1944). The conditions of the modified test being Initial catalyst temperature _____ 900° F.
Initial preheater temperature _____ 935° F.
Charge stock, standard portions from a bulk sample _____ 45–83% of East Texas crude.
Volume of charge _____ 50 ml. at 60° F.
Space rate, volume of oil/volume of catalyst/hour _____ 1.0.
Steam, wt. percent of Charge _____ 10.
Steam temperature, generated at ___ 950–1000° F.
Presteam time, min. _____ 10.
Purge time with steam _____ 5.
Condenser temperature (hot water used after purge to melt any wax) _____ 60° F.
Receiver temperature _____ 60° F.

The condenser is the Graham type, 300 mm. in length, with the drip tube extended to within ¼″ of the bottom of the receiver flask. The equipment, operation and measurements otherwise are as described in the above identified Cat-A test.

The results of the test of this catalyst are reported in the table below.

Example II

A kaolin catalyst was prepared in a manner similar to that of the catalyst in Example I with certain minor exceptions—5 kilograms of raw clay with 66.5 grams of magnesium sulfate (equivalent to 0.5% magnesium on wt. of the ignited clay) with about 1.94 liters of 93.2% sulfuric acid were mixed for 20 minutes and processed and tested thereafter as in Example I. Results are presented in the table below.

Example III

Catalyst similar to that of Example I was prepared excepting that phosphoric acid was included in the mix. Five kilograms of raw kaolin clay was mixed with 259 grams of concentrated phosphoric acid and 1.62 liters of 66° Bé. sulfuric acid for 20 minutes and then processed and tested as in Example I. Results are presented in the table below.

Example IV

A kaolin catalyst as in Example I was prepared with the addition of magnesium sulfate and phosphoric acid. Approximately 131.4 grams of magnesium sulfate·$7H_2O$ and 259 grams of concentrated phosphoric acid were mixed and heated to 210° F. until a clear solution was obtained. This solution was added slowly to 5 kilograms of raw kaolin clay together with 1.6 liters of 93.2% sulfuric acid. The mixing was continued for 20 minutes and then processed at substantially the same conditions and tested as were the other catalysts. This catalyst contained the equivalent of 0.5% MgO and 5.11% of 100% $H_3PO_4$, both by weight of the clay. Results are presented in the table below.

Example V

An example of catalyst prepared in accordance with this invention is as follows:

21.6 grams magnesium oxide and 259 grams of concentrated phosphoric acid were mixed to obtain a thick slurry of magnesium phosphate in excess phosphoric acid. This mixture was added to 1 liter of 66° Bé. sulfuric acid and added to 5 kilograms of raw kaolin clay. An additional 0.62 liter of sulfuric acid was added during a 20 minute mixing period and the remainder of the processing and testing were as on the other catalysts of Examples 1 to 4.

In the table below are shown the results obtained by testing the catalysts which in themselves have been subjected as indicated to various types of treatment before testing.

[Comparison of kaolin alone, p.5% MgO added as sulfate in mix, 5.1% H₃PO₄ in mix, 0.5% MgO as sulfate+5.1% H₃PO₄ in mix, and 0.5% MgO+5.1% H₃PO₄ (pre-reacted) in mix]

|  | K.E. Hard. | Vol. Percent Gase. | Wt. Percent Coke | Wt. Percent Gas | Sp. Gr. Gas | Wt. Percent Conv. |
|---|---|---|---|---|---|---|
| Example I: | | | | | | |
| 1. Kaolin alone (76.9% dosage H₂SO₄) | 7,700 | 35.3 | 4.0 | 19.4 | 1.40 | 54.4 |
| 2. No. 1+1,550°—4 hrs.—100% steam treat | 5,400 | 33.6 | 3.3 | 16.5 | 1.37 | 49.4 |
| 3. No. 2+1,550°—4 hrs.—100% steam treat | 4,600 | 32.1 | 2.8 | 10.6 | 1.27 | 41.6 |
| Example II: | | | | | | |
| 1. 0.50% MgO ex sulfate | 5,900 | 31.7 | 3.3 | 15.6 | 1.33 | 46.8 |
| 2. No. 1+1,550°—4 hrs.—100% steam treat | 5,100 | 30.5 | 2.7 | 13.4 | 1.30 | 42.9 |
| 3. No. 2+1,550°—4 hrs.—100% steam treat | 4,100 | 27.6 | 1.6 | 7.8 | 1.19 | 33.7 |
| Example III: | | | | | | |
| 1. 5.1% H₃PO₄ in mix (64.3% dosage H₂SO₄) | 8,200 | 35.3 | 4.2 | 17.9 | 1.38 | 53.1 |
| 2. No. 1+1,550°—4 hrs.—100% steam treat | 9,200 | 33.1 | 3.5 | 16.2 | 1.40 | 48.8 |
| Example IV: | | | | | | |
| 1. 0.5% MgO ex sulfate+5.1%H₃PO₄ | 10,600 | 33.7 | 3.6 | 17.1 | 1.39 | 50.4 |
| 2. No. 1+1,550°—4 hrs.—100% steam treat | 7,600 | 31.2 | 2.6 | 12.6 | 1.36 | 42.6 |
| Example V: | | | | | | |
| 1. 0.50% MgO+5.1% H₃PO₄ (64.3% dosage H₂SO₄) | 12,400 | 33.6 | 3.3 | 15.2 | 1.43 | 48.1 |
| 2. No. 1+1,550°—4 hrs.—100% steam treat | 10,800 | 32.2 | 2.9 | 13.3 | 1.38 | 44.6 |
| 3. No. 2+1,550°—4 hrs.—100% steam treat | 11,900 | 32.9 | 2.4 | 11.7 | 1.38 | 42.5 |

With reference to the above table the value of the present invention appears from several aspects, two of which are discussed in some detail to aid in understanding the benefits. First with reference to the K.E. hardness in which a value of 10,000 characterizes a highly desirable hardness, the product of Example V, being the essence of the invention, is found to be well above this level. The only other sample having a hardness in this range was the initial product of Example IV; however, this material after heat treatment in the presence of steam showed a value of less than 8,000.

With reference to the percent conversion values it is to be noted that the straight kaolin catalyst, even after one heat treatment had for the particular problem an unsuitable high activity; while the second steam treatment reduced the activity to an unacceptable low level. When this method of activity adjustment was applied to commercial scale operation it was found that other effects, including heat effects, entailed such extensive control needs that the cost of manufacture was roughly doubled and was thus economically unfeasible; even under the most favorable commercial preparations the product quality deviated such that only about half of the product met the specifications, thus further increasing the cost of manufacture.

Noting the results of Example II it appears that after a second steam treat the activity was at an impractical low level, indicating a very poor stream stability. The catalyst of Example III shows too high an activity level. The catalyst of Example IV while showing an acceptable activity level on the lower fringe after one steam treat, likewise exhibits such an extensive activity decrease that its steam stability is unacceptable, as well as the econimic unfeasibility of the use of relatively expensive additive plus the expense of a steam treatment.

The catalyst of Example V appears initially with a suitable activity level and exhibits a highly satisfactory resistance to steam deactivation, still retaining an acceptably high level after a second steam treatment. Thus the factors of favorable hardness, controlled activity and a very favorable product distribution establish this catalyst type as an embodiment of new and useful catalytic material.

The foregoing examples are illustrative of a general method of preparation and are not to be considered as limiting other than in connection with the general description. Obviously many modifications and variations of the invention hereinbefore set forth may be made without departing from the spirit and scope thereof, and, therefore, only such limitations should be imposed as are indicated in the appended claims.

What is claimed is:

1. In the method of preparing kaolin catalyst which includes sulfating raw kaolin to incorporate at least 15% by weight of SO₄ in the clay, denning the sulfated clay to completion of the sulfation reaction and thereafter decomposing the formed sulfate to leave all the clay components substantially free of sulfate, the improvement comprising introducing with the sulfating agent during said sulfating a magnesium-phosphate additive prepared by reacting phosphoric acid with magnesia in a mol ratio in the range in excess of 1 and no greater than 15 to 1, said additive introducing the equivalent of 0.05 to 5% MgO and 0.15 to 15% H₃PO₄, both by weight of the final catalyst.

2. In the method of preparing kaolin catalyst which includes sulfating raw kaolin, denning the sulfated clay and thereafter decomposing the formed sulfate to leave all of the clay components substantially free of sulfate, the improvement comprising adding to the clay during sulfating a magnesium phosphate additive comprising the equivalent of 0.05 to 5% MgO and 0.15 to 15% H₃PO₄ by weight of the clay, said additive having been prepared by reacting phosphoric acid with magnesia in a mol ratio in excess of 1 and no greater than 15 to 1.

3. In the method of preparing kaolin catalyst which includes sulfating raw kaolin, denning the sulfated clay and thereafter decomposing the formed sulfate to leave all of the clay components substantially free of sulfate, the improvement comprising adding to the clay during sulfating a magnesium phosphate additive comprising the equivalent of 0.25–1% MgO and 1.25–12% H₃PO₄ by weight of the clay, said additive having been prepared by reacting phosphoric acid with magnesia in a mol ratio of 5–12 to 1.

4. The method of preparing kaolin cracking catalyst characterized by improved selectivity, activity and hardness comprising admixing raw kaolin with sufficient sulfuric acid to incorporate at least 15% SO₄ by weight of the clay, simultaneously incorporating magnesium phosphate additive containing the equivalent of 0.25–1% MgO by weight of the clay and 1.25–12% H₃PO₄ by weight of the clay, said additive having been prepared by reacting phosphoric acid with magnesia in a mol ratio of 5–12 to 1; extruding said admixture into pellets having minimum dimensions in the order of about 2 to 14 mm.; denning said pellets at a temperature of about 300° F. for about 4 hours; desulfating said denned pellets at a temperature in the range of about 1100–1500° F. for a time in the order of about 4 hours and in the presence of a gaseous atmosphere comprising 15% hydrogen and 85% steam; and obtaining pellets of cracking catalyst characterized by improved selectivity, activity and hardness.

References Cited in the file of this patent

UNITED STATES PATENTS

| 2,470,203 | Wickenden | May 17, 1949 |
| 2,485,626 | Mills | Oct. 25, 1949 |
| 2,496,621 | Deery | Feb. 7, 1950 |